(12) United States Patent
Oh et al.

(10) Patent No.: US 9,001,624 B2
(45) Date of Patent: Apr. 7, 2015

(54) MOBILE TERMINAL AND METHOD OF SETTING ALARM THEREIN

(71) Applicant: Samsung Electronics Co., Ltd., Suwon-si (KR)

(72) Inventors: Jung Yeob Oh, Seongnam-si (KR); Ji Sun Yang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/144,180

(22) Filed: Dec. 30, 2013

(65) Prior Publication Data

US 2014/0112109 A1 Apr. 24, 2014

Related U.S. Application Data

(63) Continuation of application No. 13/724,021, filed on Dec. 21, 2012, now Pat. No. 8,630,150, which is a continuation of application No. 12/250,230, filed on Oct. 13, 2008, now Pat. No. 8,358,564.

(30) Foreign Application Priority Data

Dec. 6, 2007 (KR) ........................ 10-2007-0126040

(51) Int. Cl.
*G04C 21/00* (2006.01)
*G04G 13/02* (2006.01)
(Continued)

(52) U.S. Cl.
CPC .............. *G04G 21/00* (2013.01); *G04G 13/021* (2013.01); *G06Q 10/109* (2013.01); *H04M 1/72522* (2013.01); *H04M 2250/22* (2013.01); *G04G 13/026* (2013.01); *Y10S 715/963* (2013.01)

(58) Field of Classification Search
USPC ......... 368/10, 13, 28, 29, 41–43, 72–74, 250, 368/251, 263; 455/556.2; 704/7.18–7.21; 715/963
See application file for complete search history.

(56) References Cited

U.S. PATENT DOCUMENTS 5,220,540 A 6/1993 Nishida et al.
5,457,476 A 10/1995 Jenson
(Continued)

FOREIGN PATENT DOCUMENTS

EP 1531597 A2 5/2005
EP 1742122 A2 1/2007
(Continued)

OTHER PUBLICATIONS

International Search Report dated Mar. 31, 2009 issued for PCT/KR2008/006217.
(Continued)

*Primary Examiner* — Vit W Miska
(74) *Attorney, Agent, or Firm* — Jefferson IP Law, LLP

(57) ABSTRACT

A mobile terminal and a method of setting an alarm therein are provided. The mobile terminal includes a controller, a display unit, and a memory unit. The controller controls the display unit to display an alarm setting screen on which alarm dates are arranged in a first direction and alarm time points are arranged in a second direction, the alarm screen being displayed in an alarm setting mode and sets an alarm at a selected time point of each alarm date in response to selection of the alarm time point. The controller also controls the memory unit to store a set alarm on an alarm date and alarm time point. The display unit displays an alarm image at an intersection of an alarm date and an alarm time point of each set alarm.

18 Claims, 10 Drawing Sheets

(51) Int. Cl.
*H04M 1/00* (2006.01)
*G04G 21/00* (2010.01)
*G06Q 10/10* (2012.01)
*H04M 1/725* (2006.01)

(56) References Cited

U.S. PATENT DOCUMENTS

| | | |
|---|---|---|
| 5,570,109 A | 10/1996 | Jenson |
| 5,754,629 A | 5/1998 | Kunimori et al. |
| 5,873,108 A | 2/1999 | Goyal et al. |
| 7,457,642 B2 | 11/2008 | Kamata et al. |
| 7,822,713 B2 | 10/2010 | Hullot et al. |
| 7,840,543 B2 | 11/2010 | Guiheneuf et al. |
| 8,358,564 B2 * | 1/2013 | Oh et al. .......... 368/10 |
| 8,630,150 B2 * | 1/2014 | Oh et al. .......... 368/10 |
| 2002/0191035 A1 | 12/2002 | Selent |
| 2003/0083051 A1 | 5/2003 | Ntende |
| 2003/0128226 A1 | 7/2003 | Handy Bosma et al. |
| 2005/0105396 A1 | 5/2005 | Schybergson |
| 2005/0125737 A1 | 6/2005 | Allen et al. |
| 2007/0008827 A1 | 1/2007 | Shin et al. |

FOREIGN PATENT DOCUMENTS

| | | |
|---|---|---|
| KR | 10-2001-0054520 | 7/2001 |
| KR | 10-2006-0121478 | 11/2006 |
| KR | 10-2007-0010849 | 1/2007 |
| KR | 2007-0009183 A | 1/2007 |
| WO | 03039177 A1 | 5/2003 |

OTHER PUBLICATIONS

Written Opinion dated Mar. 31, 2009 issued for PCT/KR2008/006217.

Non-Final Office Action dated Jun. 24, 2011 issued for U.S. Appl. No. 12/250,230.

Final Office Action dated Feb. 1, 2012 issued for U.S. Appl. No. 12/250,230.

Non-Final Office Action dated May 11, 2012 issued for U.S. Appl. No. 12/250,230.

Notice of Allowance dated Sep. 17, 2012 issued for U.S. Appl. No. 12/250,230.

* cited by examiner

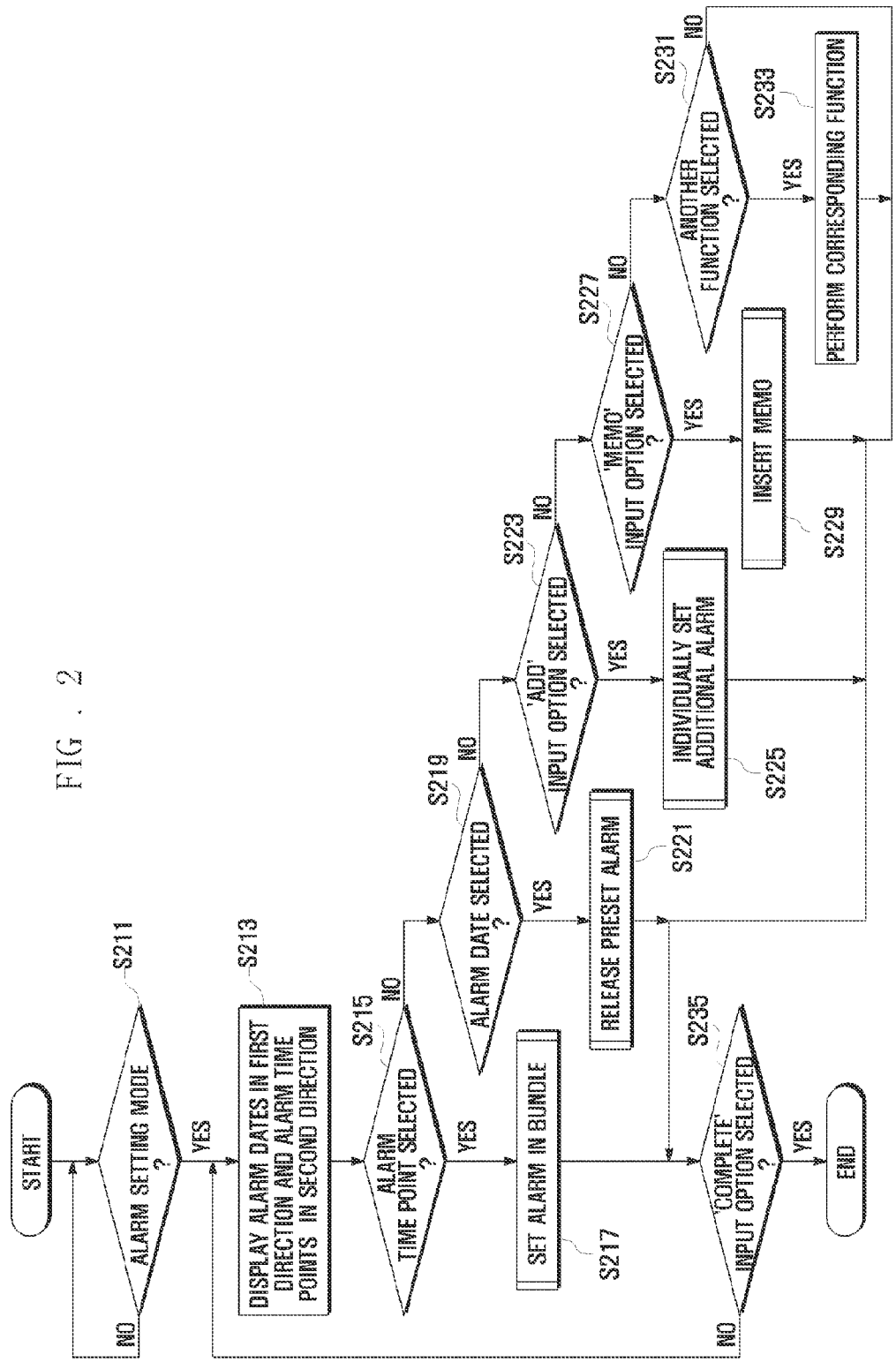

MOBILE TERMINAL AND METHOD OF SETTING ALARM THEREIN

CROSS REFERENCE TO RELATED APPLICATIONS

This is a continuation application of U.S. patent application Ser. No. 13/724,021 filed Dec. 21, 2012, which issued as U.S. Pat. No. 8,630,150 on Jan. 14, 2014, which is a continuation application of U.S. patent application Ser. No. 12/250,230, filed on Oct. 13, 2008, which issued as U.S. Pat. No. 8,358,564 on Jan. 22, 2013, and claims priority from and the benefit of Korean Patent Application No. 10-2007-0126040, filed on Dec. 6, 2007, each of which is hereby incorporated by reference for all purposes as if fully set forth herein.

BACKGROUND

1. Field

The present invention relates to a mobile terminal and a method of setting an alarm therein, and more particularly, to a mobile terminal and a method of setting an alarm therein that may enable easy setting of a plurality of alarms.

2. Discussion

Nowadays, due to the remarkable development of information and communication technology and semiconductor technology, the use of various mobile terminals has rapidly increased and become widespread. Particularly, recent mobile terminals may include various new functions in addition to a communication function such as voice communication and a character messaging service. Examples of functions added to the mobile terminal may include an alarm function and a calculator function.

However, an alarm function in the mobile terminal may be difficult to use. Particularly, when setting a plurality of alarms, the mobile terminal may individually set each alarm and separately manage the set alarms. Accordingly, it may be difficult for the user of the mobile terminal to check the set alarms in a bundle. For example, it may be difficult for the user of the mobile terminal to determine whether an alarm is set in the mobile terminal for a specific date or a specific time point and to set an alarm according to the determination result.

SUMMARY

The present invention provides a mobile terminal and a method of setting an alarm therein that may enable easy setting of a plurality of alarms.

Additional features of the invention will be set forth in the description which follows, and in part will be apparent from the description, or may be learned by practice of the invention.

The present invention discloses a method of setting an alarm in a mobile terminal including displaying an alarm setting screen on which alarm dates are arranged in a first direction and alarm time points are arranged in a second direction, the alarm setting screen being displayed in an alarm setting mode, setting an alarm at a first alarm time point of each alarm date in response to selection of the first time point, and releasing the alarm of a first alarm date in response to selection of the first alarm date.

The present invention also discloses a method of setting an alarm in a mobile terminal having a touch screen including displaying an alarm setting screen on which alarm dates are arranged in a first direction and alarm time points are arranged in a second direction, the alarm setting screen being displayed on the touch screen in an alarm setting mode, setting an alarm at a first alarm time point of each alarm date in response to detection of a touch and a drop on the first alarm time point, and releasing the alarm of a first alarm date in response to a touch and a drop on the first alarm date.

The present invention also discloses a mobile terminal including a display unit, a controller, and a memory unit. The controller controls the display unit to display an alarm setting screen on which alarm dates are arranged in a first direction and alarm time points are arranged in a second direction, the alarm setting screen being displayed in an alarm setting mode and sets an alarm at a first time point of each alarm date in response to selection of the first time point. The controller also controls the memory unit to store a set alarm on an alarm date and alarm time point. The display unit displays an alarm image at an intersection of the alarm date and alarm time point of the set alarm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 is a flowchart showing a method of setting an alarm according to another exemplary embodiment of the present invention.

DETAILED DESCRIPTION OF THE ILLUSTRATED EMBODIMENTS

Figure 1:
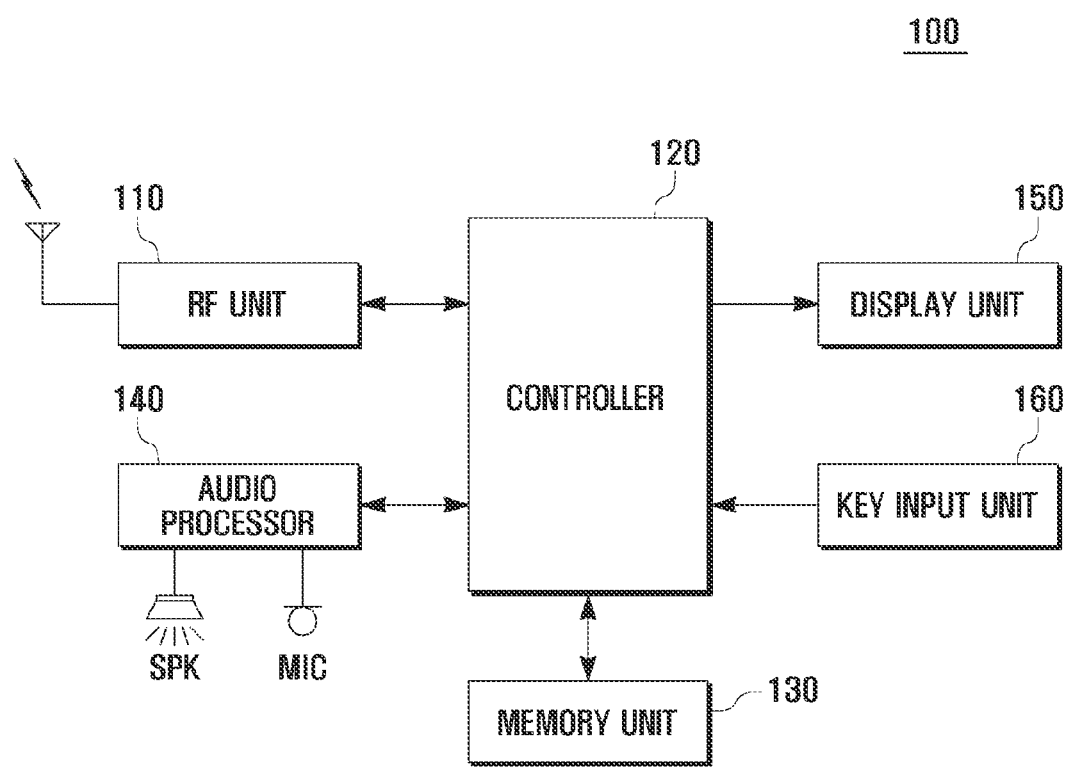
FIG. 1 is a block diagram showing a configuration of a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

In the following description, the term "alarm" indicates notification of a specific date or a specific time point in a mobile terminal. The term "alarm setting mode" indicates a mode of setting an alarm to occur at a specific date or a specific time point in the mobile terminal. The alarm may be a plurality of notifications set in a bundle to a plurality of specific dates, or may be individually set to each specific date. The term "alarm date" indicates at least one of an alarm date and an alarm day for which each alarm may be set in the mobile terminal. The term "alarm time point" indicates a time point for which each alarm may be set in the mobile terminal. The term "alarm image" indicates an image notifying that an alarm is set for a specific alarm date and alarm time point. Such an alarm image may be provided in various forms according to the setting of the mobile terminal.

The term "alarm setting screen" indicates a screen displayed in an alarm setting mode. In the alarm setting screen, alarm dates are arranged in a first direction and alarm time points are arranged in a second direction. In this case, on the alarm setting screen, for each alarm date arranged in the first direction, a highlighted area may extend in the second direction, and for each alarm time point arranged in the second direction, a highlighted area may extend in the first direction. Here, the extended area of the first direction and that of the second direction may intersect. Further, when a preset alarm exists, the mobile terminal may display an alarm image corresponding to the preset alarm on the alarm setting screen. In addition, the alarm setting screen may include 'add', 'memo', and 'complete' input options.

The term "touch" indicates an operation in which a user of the mobile terminal touches a touch screen thereof with a stylus or a finger. The term "drop" indicates an operation in which the user of the mobile terminal removes the stylus or finger touching the touch screen from the touch screen. The term "drag" indicates an operation in which the user of the mobile terminal moves the stylus or finger in a state where the finger continues to touch the touch screen.

FIG. 1 is a block diagram showing a configuration of a mobile terminal 100 according to an exemplary embodiment of the present invention. In the exemplary embodiment, the mobile terminal 100 is exemplified as a mobile phone.

Referring to FIG. 1, the mobile terminal 100 includes a radio frequency (RF) unit 110, a controller 120, a memory unit 130, an audio processor 140, a display unit 150, and a key input unit 160.

The RF unit 110 performs a wireless communication function of the mobile terminal 100. The RF unit 110 includes an RF transmitter to up-convert a frequency of a signal to be transmitted and amplify the signal, and an RF receiver to low-noise amplify a received signal and down-convert a frequency of the signal.

The controller 120 controls the general operations of the mobile terminal 100. The controller 120 includes a data processor including a transmitter to encode and modulate a signal to be transmitted and a receiver to demodulate and decode a received signal. The data processor includes a modem and a codec. The codec includes a data codec to process packet data and an audio codec to process an audio signal such as a voice.

The controller 120 controls the display unit 150 to display an alarm setting screen in which alarm dates are arranged in a first direction and alarm time points are arranged in a second direction in an alarm setting mode according to an exemplary embodiment of the present invention. If an alarm time point is selected, the controller 120 sets an alarm at the selected alarm time point of each alarm date.

Alternatively, when an 'add' input option is selected, if an alarm date is selected, the controller 120 additionally sets an alarm at the selected alarm time point of the selected alarm date. In this case, the controller 120 controls the display unit 150 to display an alarm image at an intersection of an alarm date and an alarm time point of an alarm set according to an exemplary embodiment of the present invention. Further, the controller 120 releases a preset alarm of the selected alarm date. In addition, when a 'memo' input option is selected, the controller 120 inserts a memo into the selected alarm.

The memory unit 130 includes a program memory and a data memory. The program memory stores programs to control general operations of the mobile terminal 100. The program memory stores programs to set an alarm according to the exemplary embodiment of the present invention. The data memory stores data generated while performing programs. The memory unit 130 stores a preset alarm on an alarm date and alarm time point basis by the control of the controller 120.

The audio processor 140 reproduces an audio signal received from the audio codec of the data processor through a speaker SPK and transmits an audio signal generated in a microphone MIC to the audio codec of the data processor.

The display unit 150 displays user data output from the controller 120. The display unit 150 may include a liquid crystal display (LCD) unit including an LCD controller, a memory to store image data, and an LCD display element. If the LCD unit is embodied as a touch screen, the display unit 150 may be operated as an input unit. In this case, the touch screen detects an operation such as a touch, a drop, and a drag from a change in a value of a physical characteristic, for example resistance and capacitance. The touch screen converts the change in the value of the physical characteristic to a touch signal.

The key input unit 160 includes keys to input numeral and character information and function keys to set various functions.

Figure 3A:
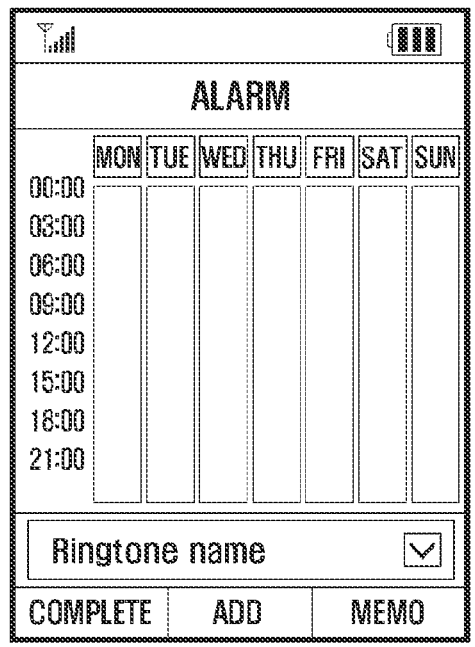
FIG. 3A, FIG. 3B, FIG. 3C, FIG. 3D, FIG. 3E, FIG. 3F, FIG. 3G, FIG. 3H, and FIG. 3I show examples of screens displayed in the method of setting an alarm of FIG. 2.
Figure 3B:
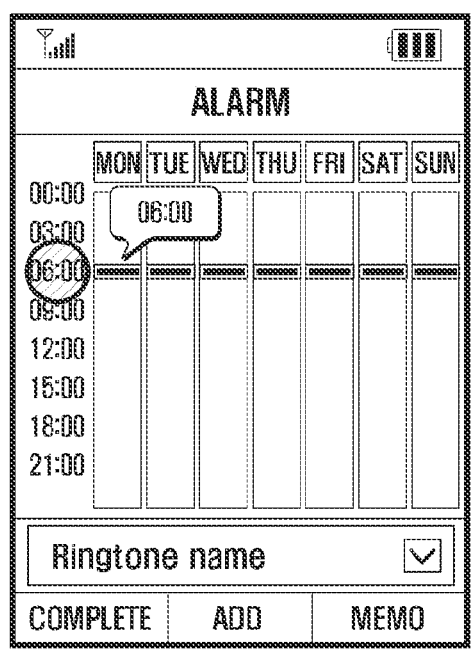
Figure 3C:
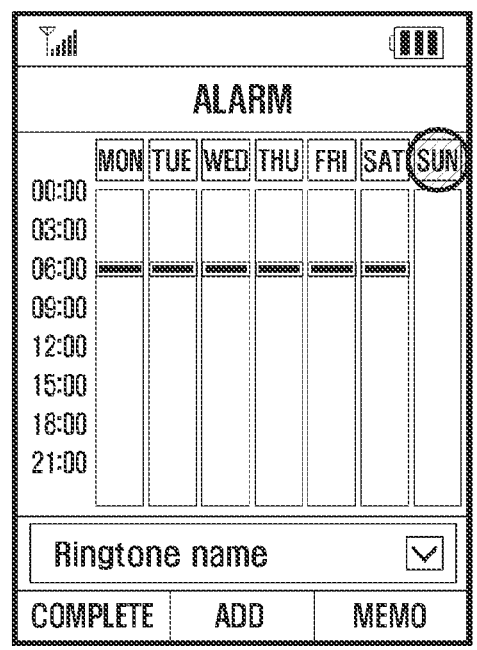
Figure 3D:
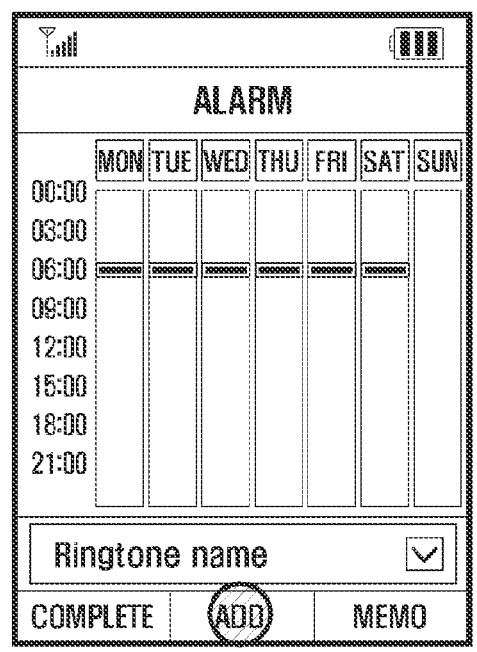
Figure 3E:
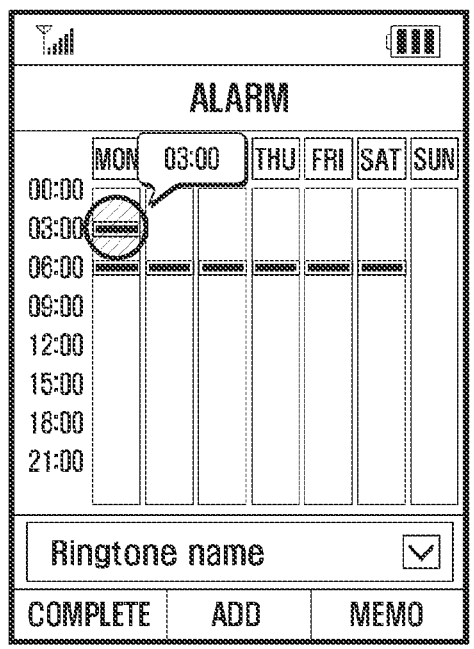
Figure 3F:
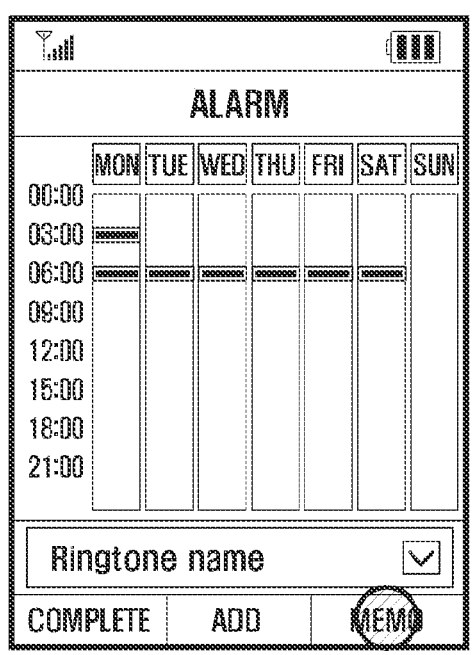
Figure 3G:
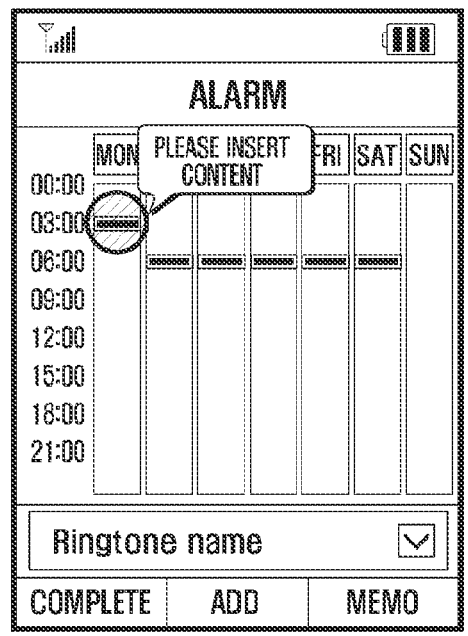
Figure 3H:
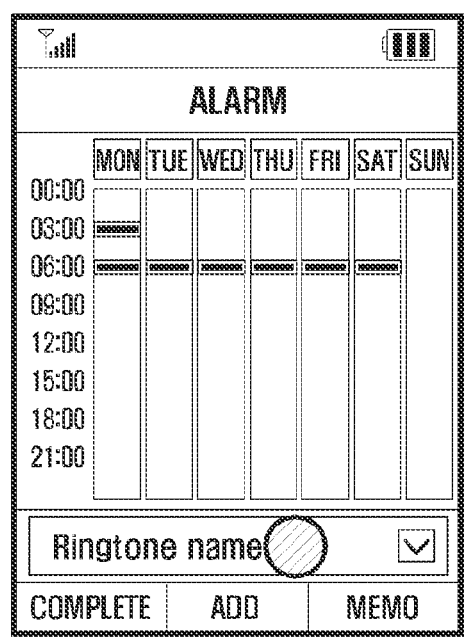
Figure 3I:
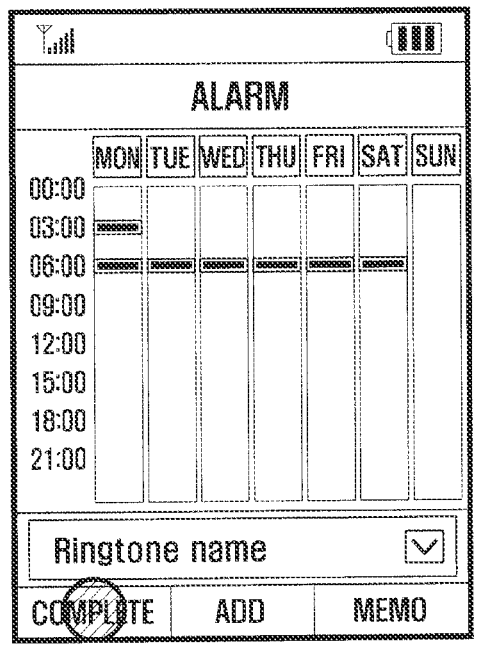

FIG. 2 is a flowchart showing a method of setting an alarm according to another exemplary embodiment of the present invention. FIG. 3A, FIG. 3B, FIG. 3C, FIG. 3D, FIG. 3E, FIG. 3F, FIG. 3G, FIG. 3H, and FIG. 3I show examples of screens displayed in the method of setting an alarm of FIG. 2. FIG. 3A, FIG. 3B, FIG. 3C, FIG. 3D, FIG. 3E, FIG. 3F, FIG. 3G, FIG. 3H, and FIG. 3I show a case where the display unit 150 of the mobile terminal is embodied as a touch screen. FIG. 3A shows a screen displayed in an alarm setting mode, FIG. 3B shows a screen displayed when an alarm time point is selected, FIG. 3C shows a screen displayed when an alarm date is selected, FIG. 3D and FIG. 3E show screens displayed when an alarm is added, FIG. 3F and FIG. 3G show screens displayed when a memo is inserted, FIG. 3H shows a screen displayed when another function is performed, and FIG. 3I shows a screen displayed when a request to terminate an alarm setting process is input.

Referring to FIG. 2, the controller 120 determines whether a request to execute an alarm setting mode is input (S211). If a request to execute an alarm setting mode is input, the controller 120 controls the display unit 150 to display an alarm setting screen (S213), as shown in FIG. 3A. In the example of FIG. 3A, the controller 120 arranges alarm dates in a horizontal first direction and alarm time points in a vertical second direction on the alarm setting screen.

The controller 120 determines whether a specific alarm time point is selected on the alarm setting screen (S215). If a specific alarm time point is selected on the alarm setting screen, the controller 120 sets an alarm in a bundle at the selected alarm time point (S217), as shown in FIG. 3B. That is, if a specific alarm time point is selected without selecting a specific alarm date, the controller 120 sets an alarm at the selected alarm time point for all alarm dates in a bundle.

When the display unit 150 is embodied as a touch screen, if a touch is detected on the touch screen when displaying the alarm setting screen, the controller 120 determines that an alarm time point of the touch position is selected.

Figure 4:
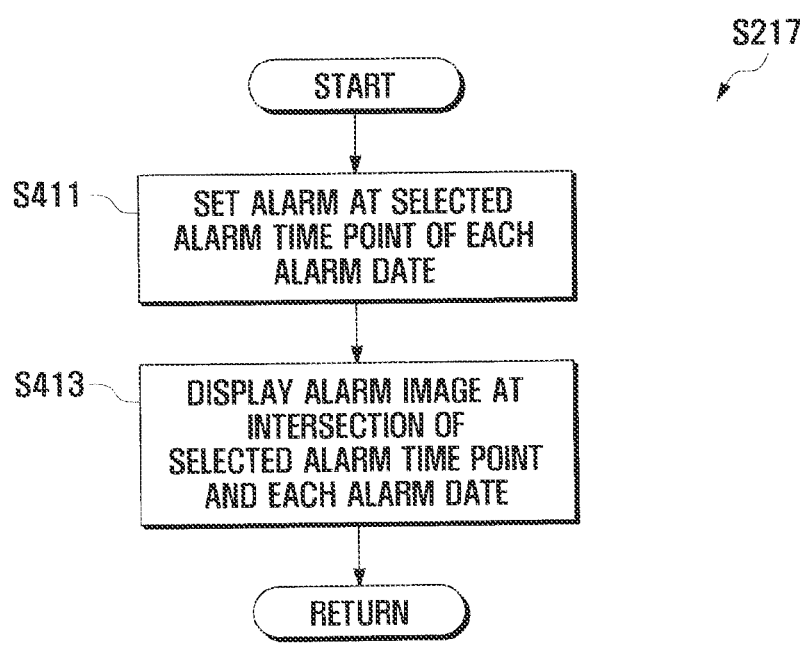
FIG. 4 is a flowchart showing a process of setting an alarm in a bundle in the method of FIG. 2.

FIG. 4 is a flowchart showing a process of setting an alarm in a bundle at step S217 of the method of FIG. 2.

Referring to FIG. 4, if a specific alarm time point is selected, the controller 120 sets an alarm at the selected alarm time point of each alarm date (S411). That is, the controller 120 sets an alarm in a bundle at an identical alarm time point of all alarm dates.

The controller 120 controls to display an alarm image at intersections of the selected alarm time point and each alarm date (S413), and the process returns to FIG. 2.

Although not shown in the screen example of FIG. 3B, when the display unit 150 is embodied as a touch screen, if a drop is detected at a touch position, the controller 120 performs steps S411 and S413. However, if a drop is not detected at a touch position, but rather a drag is detected from the touch position in the first direction, the controller 120 detects all alarm dates that are touched in the first direction of the drag path. Thereafter, the controller 120 sets an alarm in a bundle at the selected alarm time point of each alarm date included in the drag. Further, the controller 120 controls the display unit 150 to display an alarm image at intersections of the selected alarm time points and the alarm dates included in the drag path, and the process returns to FIG. 2.

If a specific alarm time point is not selected on the alarm setting screen at step S215, the controller 120 determines whether a specific alarm date is selected on the alarm setting screen (S219). If a specific alarm date is selected on the alarm setting screen by a touch and drop, the controller 120 releases the alarm of the selected alarm date (S221), as shown in FIG. 3C. That is, if a specific alarm date is selected without selecting a specific alarm time point, the controller 120 releases the alarm of the selected alarm date.

Figure 5:
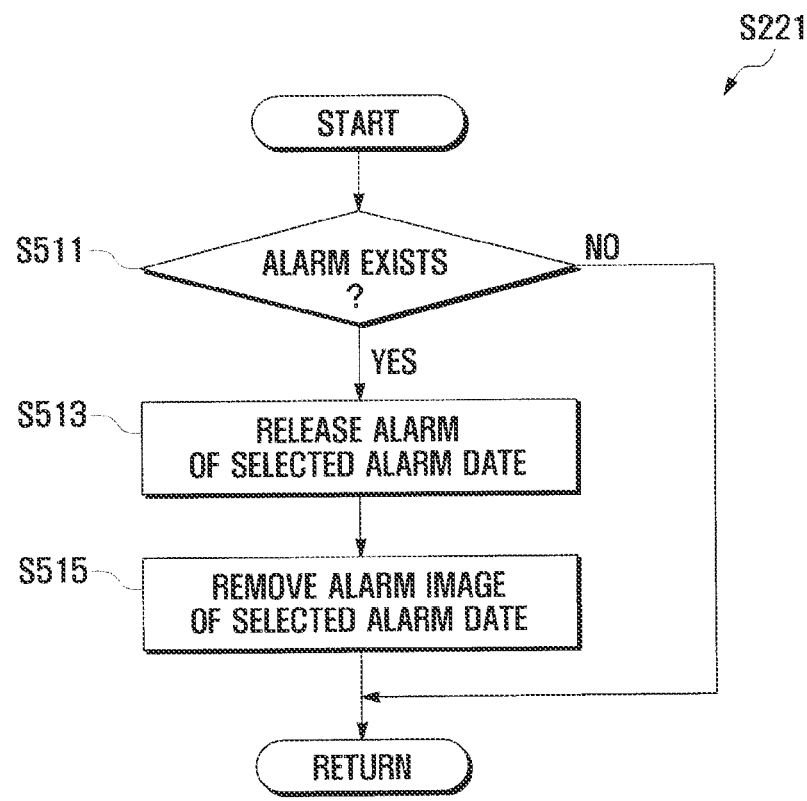
FIG. 5 is a flowchart showing a process of releasing an alarm in the method of FIG. 2.

FIG. 5 is a flowchart showing a process of releasing an alarm at step S221 of the method of FIG. 2.

Referring to FIG. 5, if a specific alarm date is selected, the controller 120 determines whether an alarm exists at the selected alarm date (S511).

If an alarm does not exist at the selected alarm date, the process returns to FIG. 2. If an alarm exists at the selected alarm date, the controller 120 releases the alarm of the selected alarm date (S513).

The controller 120 removes an alarm image displayed at a position corresponding to the selected alarm date (S515), and the process returns to FIG. 2.

If a specific alarm date is not selected at step 219, the controller 120 determines whether an 'add' input option is selected on the alarm setting screen (S223). If an 'add' input option is selected on the alarm setting screen, as shown in FIG. 3D, the controller 120 individually sets an additional alarm for a selected alarm time point and alarm date (S225), as shown in FIG. 3E. That is, if an 'add' input option is selected without having selected a specific alarm time point at step 215 or an alarm date at step 223, the controller 120 individually sets an additional alarm.

Figure 6:
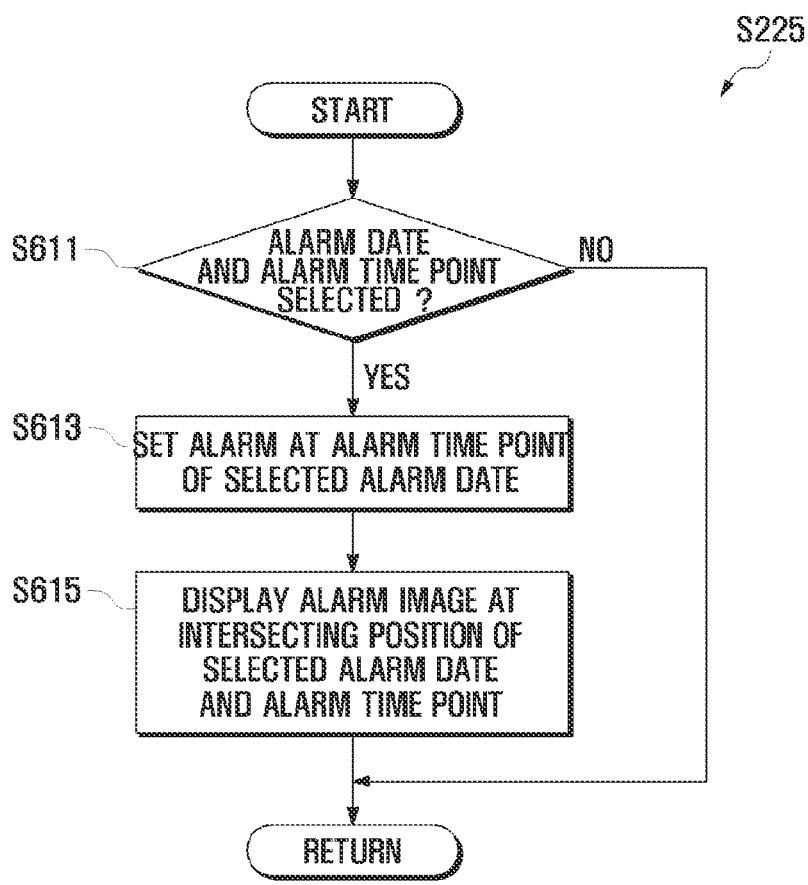
FIG. 6 is a flowchart showing a process of individually setting an alarm in the method of FIG. 2.

FIG. 6 is a flowchart showing a process of individually setting an alarm at step S225 of the method of FIG. 2.

Referring to FIG. 6, after an 'add' input option is selected, the controller 120 determines whether a specific alarm date and alarm time point are selected (S611). If a specific alarm date and alarm time point are selected, the controller 120 sets an alarm at the selected alarm time point of the selected alarm date (S613). In this case, the alarm date and the alarm time point may be sequentially selected.

When the display unit 150 is embodied as a touch screen, if a touch is detected on the touch screen, the controller 120 detects a corresponding alarm date and alarm time point at the touch position and sets an alarm at the detected alarm time point of the detected alarm date.

The controller 120 controls the display unit 150 to display an alarm image at an intersection of the selected alarm date and alarm time point (S615), and the process returns to FIG. 2.

If an 'add' input option is not selected on the alarm setting screen at step 223, the controller 120 determines whether a 'memo' input option is selected on the alarm setting screen (S227). If a 'memo' input option is selected on the alarm setting screen, as shown in FIG. 3F, the controller 120 inserts a memo (S229), as shown in FIG. 3G. In this case, the controller 120 inserts a memo written to correspond to a specific alarm.

Figure 7:
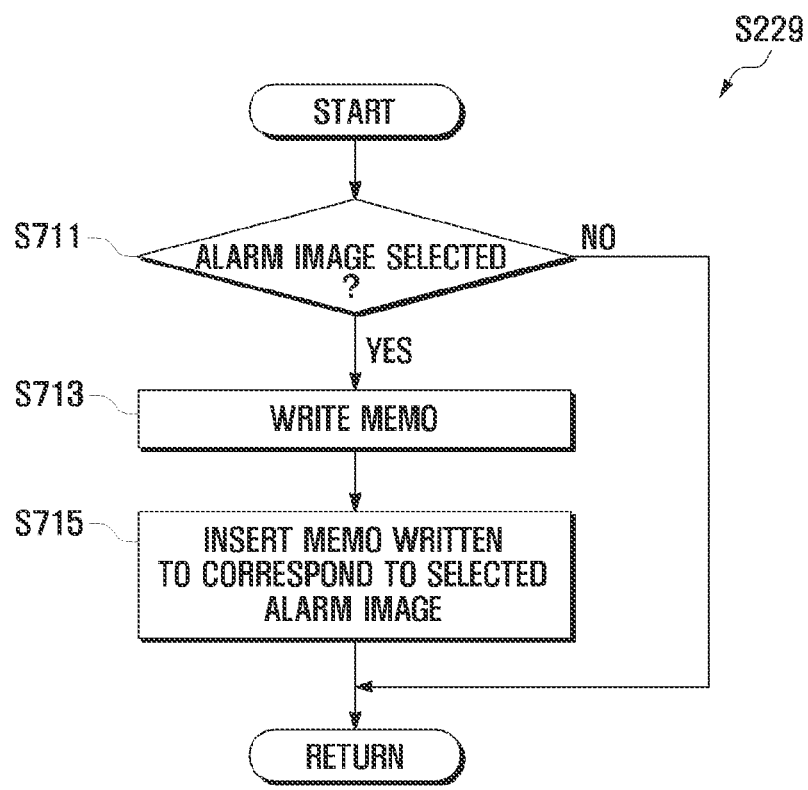
FIG. 7 is a flowchart showing a process of inserting a memo in the method of FIG. 2.

FIG. 7 is a flowchart showing a process of inserting a memo of step S229 in the method of FIG. 2.

Referring to FIG. 7, after a 'memo' input option is selected, the controller 120 determines whether a specific alarm image is selected (S711). If a specific alarm image is selected, the controller 120 writes a memo according to input by a user (S713).

The controller 120 inserts the memo written to correspond to the selected alarm image (S715), and the process returns to FIG. 2.

If a 'memo' input option is not selected on the alarm setting screen at step S227, the controller 120 determines whether a request for another function is input on the alarm setting screen (S231). If a request for another function is input on the alarm setting screen, as shown in FIG. 3H, the controller 120 performs the corresponding function (S233). For example, the controller 120 may select which one of an audio signal, a text signal, and a vibration signal is to be used when a preset alarm is output. The controller 120 may select an alarm reproduction sound for an alarm, or may enlarge or reduce a predetermined area of the alarm setting screen to enable a user of the mobile terminal 100 to more easily select an alarm date or an alarm time point.

Alternatively, when the display unit 150 is embodied as a touch screen, if a sequential touch, drag, and drop action is detected at a specific alarm image, the controller 120 moves the alarm image to the drop position. That is, the controller 120 may change an alarm date or alarm time point.

The controller 120 determines whether a 'complete' input option is selected on the alarm setting screen (S235). If a 'complete' input option is selected on the alarm setting screen, as shown in FIG. 3I, the controller 120 terminates the alarm process. If a 'complete' input option is not selected on the alarm setting screen, the controller 120 repeatedly performs steps S213 to S233 until a 'complete' input option is selected.

As described above, according to exemplary embodiments of the present invention, when an alarm is set in the mobile terminal, a plurality of alarms may be easily set and released on a single screen. The mobile terminal may integrally manage preset alarms on the single screen. Thereby, a user of the mobile terminal may integrally check the preset alarms. Further, upon setting another alarm in the mobile terminal, checking of a preset alarm and setting of another alarm may be performed simultaneously.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method in a mobile terminal, the method comprising:
    displaying time in a first direction, day of the week in a second direction, and an alarm image indicating an alarm for a particular time and at least one day of the week, the alarm image being displayed at an intersection of the particular time and the at least one day of the week;
    receiving an input for changing the alarm, wherein the input comprises dragging the alarm image and dropping the alarm image;
    displaying the alarm image at a dropped position; and
    changing the alarm to the time corresponding to the dropped position of the alarm image.

2. The method of claim 1, wherein the displaying of the alarm image further comprises:
    moving the alarm image to the position to be dropped; and
    maintaining the at least one day of the week of the changed alarm.

3. The method of claim 1, further comprising:
    detecting a text insert request;
    receiving text; and
    displaying the text in relation to a corresponding alarm image.

4. The method of claim 3, wherein the text insert request corresponds to a request for inputting a memo to the alarm image corresponding to the alarm.

5. The method of claim 1, further comprising:
    displaying the particular time of the alarm at a position other than a position at which the alarm image is displayed.

6. The method of claim 1, wherein the first direction comprises one of a portrait direction and a landscape direction and the second direction comprises the other of the portrait direction and the landscape direction.

7. The method of claim 1, wherein the days of the week comprise Monday, Tuesday, Wednesday, Thursday, Friday, Saturday, and Sunday.

8. The method of claim 1, wherein the time displayed in the first direction comprises a certain hourly interval.

9. The method of claim 1, further comprising:
    detecting an alarm add menu input;
    setting the alarm according to the input; and
    displaying the alarm image at a time and day of the week according to the input.

10. A mobile terminal comprising:
    a touch screen; and
    a controller configured to control the touch screen to display time in a first direction, day of the week in a second direction, and an alarm image indicating an alarm for a particular time and at least one day of the week, the alarm image being displayed an intersection of the particular time and the at least one day of the week, to receive an input for changing the alarm, to display the alarm image at a dropped position, and to change the time of the alarm to the time corresponding to the dropped position of the alarm image,
    wherein the input comprises dragging the alarm image and dropping the alarm image.

11. The mobile terminal of claim 10, wherein the controller is further configured to move the alarm image to the position to be dropped, and to maintain the at least one day of the week of the changed alarm.

12. The mobile terminal of claim 10, wherein the controller is further configured to detect a text insert request, to receive text, and to control the touch screen to display the text in relation to a corresponding alarm image.

13. The mobile terminal of claim 12, wherein the text insert requests corresponds to a request for inputting a memo to the alarm image corresponding to the alarm.

14. The mobile terminal of claim 10, wherein the controller is further configured to display the particular time of the alarm at a position other than a position at which the alarm image is displayed.

15. The mobile terminal of claim 10, wherein the first direction comprises one of a portrait direction and a landscape direction and the second direction comprises the other of the portrait direction and the landscape direction.

16. The mobile terminal of claim 10, wherein the day of the week comprise Monday, Tuesday, Wednesday, Thursday, Friday, Saturday, and Sunday.

17. The mobile terminal of claim 10, wherein the time displayed in the first direction comprises a certain hourly interval.

18. The mobile terminal of claim 10, wherein the controller is further configured to set the alarm and display the alarm image at a time and day of the week corresponding to an alarm add menu input.

* * * * *